(12) United States Patent
Nilsson

(10) Patent No.: US 7,868,477 B2
(45) Date of Patent: Jan. 11, 2011

(54) DEVICE FOR SUPPLYING ELECTRICITY

(75) Inventor: Bernt Nilsson, Huskvarna (SE)

(73) Assignee: SAAB AB, Linköping (SE)

( * ) Notice: Subject to any disclaimer, the term of this patent is extended or adjusted under 35 U.S.C. 154(b) by 331 days.

(21) Appl. No.: 12/213,181

(22) Filed: Jun. 16, 2008

(65) Prior Publication Data

US 2009/0033099 A1 Feb. 5, 2009

(30) Foreign Application Priority Data

Jun. 15, 2007 (EP) .................... 07110337

(51) Int. Cl.
*F03B 13/00* (2006.01)

(52) U.S. Cl. .................... 290/55
(58) Field of Classification Search .......... 290/54, 290/55

See application file for complete search history.

(56) References Cited

U.S. PATENT DOCUMENTS

| | | | | |
|---|---|---|---|---|
| 2,153,523 | A * | 4/1939 | Edmonds et al. | 290/55 |
| 4,039,848 | A * | 8/1977 | Winderl | 290/55 |
| 4,073,516 | A * | 2/1978 | Kling | 290/55 |
| 4,748,808 | A * | 6/1988 | Hill | 60/398 |
| 4,955,560 | A | 9/1990 | Nishina et al. | |
| 5,506,453 | A * | 4/1996 | McCombs | 290/44 |
| 5,760,515 | A * | 6/1998 | Burns | 310/115 |
| 6,127,739 | A * | 10/2000 | Appa | 290/55 |
| 6,278,197 | B1 * | 8/2001 | Appa | 290/55 |
| 6,476,513 | B1 * | 11/2002 | Gueorguiev | 290/55 |
| 7,102,249 | B2 * | 9/2006 | Wobben | 290/54 |
| 7,602,077 | B2 * | 10/2009 | Ferguson | 290/55 |
| 7,679,249 | B2 * | 3/2010 | Appa et al. | 310/114 |
| 2002/0109356 | A1 | 8/2002 | Klausing et al. | |
| 2003/0052487 | A1 | 3/2003 | Weingarten | |
| 2006/0061107 | A1 | 3/2006 | Cadaret | |
| 2007/0241566 | A1 * | 10/2007 | Kuehnle | 290/53 |
| 2008/0136189 | A1 * | 6/2008 | Qu et al. | 290/52 |

FOREIGN PATENT DOCUMENTS

| | | |
|---|---|---|
| DE | 10356230 A1 | 7/2005 |
| EP | 1227335 A | 7/2002 |
| WO | WO 2007147640 A1 * | 12/2007 |

OTHER PUBLICATIONS

European Search Report—Aug. 6, 2007.

* cited by examiner

*Primary Examiner*—Joseph Waks
(74) *Attorney, Agent, or Firm*—Venable LLP; Eric J. Franklin

(57) ABSTRACT

A device for supplying electricity to electrical equipment on a first element drivable for rotating operation with a predetermined rotation rate. A source of electricity includes a stator and a rotor that are rotatable in relation to each other. One of the rotor and stator is attached to the first element and another of the rotor and stator is attached to a second element including at least one braking member. In accordance with a predetermined drag coefficient, when interacting with a surrounding fluid medium in rotating operation a braking torque is induced, which results in a difference in rotation rate between the first element and the second element. An output to the source of electricity is based on a product of the braking torque and the rotation rate difference.

14 Claims, 4 Drawing Sheets

DEVICE FOR SUPPLYING ELECTRICITY

CROSS-REFERENCE TO RELATED APPLICATIONS

This application claims priority to European patent application 07110337.8 filed 15 Jun. 2007.

BACKGROUND OF THE INVENTION

1. Technical Field of the Invention

The present invention is related to a device for supplying electricity to electrical equipment on a rotatable first element. More particularly the first element might be configured by means of a rotor for an aircraft, a helicopter etc. configured with rotor blades or any other rotating element where it is unsuitable to use the common solutions available today.

2. Description of Related Art

There are a number of alternative solutions to supply electricity to electrical equipment located on a rotating element, among others transmission of power by slip-rings or by rechargeable batteries, fuel cells etc., which are mounted on the rotating element together with the equipment. However slip-rings require considerable installation measures, are unsuitable for a complementary installation and have a limited useful life due to wear and tear. Rechargeable batteries suffer from drawbacks in that they require charging recurrently. Fuel cells need to be refueled with a hazardous liquid repeatedly and most probably cannot resist the impact of large environmental centrifugal forces. Fuel cells are at present not appropriate as a small size product. Up to now the related technical field lacks a suitable solution to the problem.

SUMMARY OF THE INVENTION

It is an object of the present invention to provide a less maintenance requiring supply of electricity to electrical equipment on a rotatable element.

For this purpose the device according to the present invention comprises electricity producing means provided with a stator and a rotor that are rotatable in relation to each other, one of the rotor and stator being attached to said first element and the other to a second element provided with at least one braking member, configured in accordance with a predetermined drag coefficient $C_d$, for interaction with a surrounding fluid medium in rotating operation and thereby inducing a braking torque $T_{AB}$, which results in a difference $f_{diff}$ in rotation rate between the first element and said second element, and that an output power $P_G$ to said electricity producing means is based on the product of said braking torque $T_{AB}$ and said rotation rate difference $f_{diff}$.

Advantageous improvements and developments appear from the description and the dependent claims.

DESCRIPTION OF EMBODIMENTS OF THE INVENTION

Figure 1:
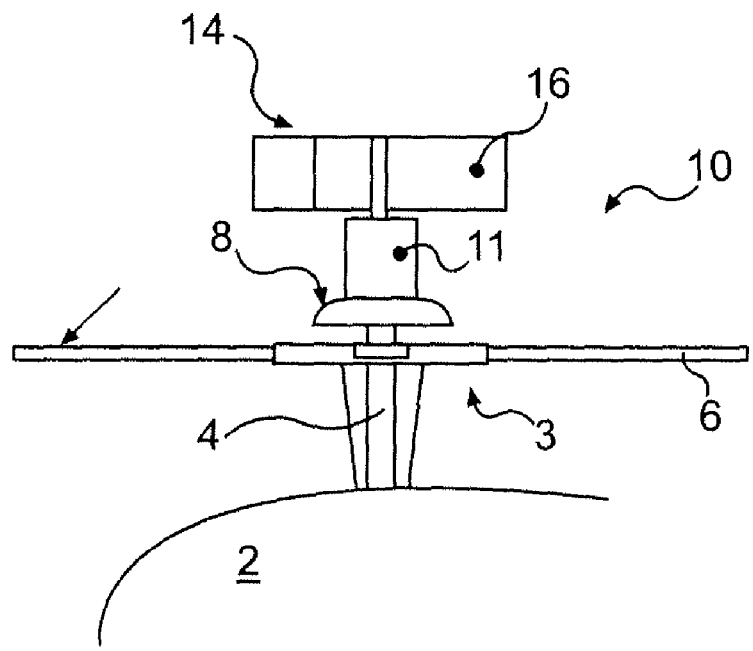
FIG. 1 is a schematic side view of a helicopter with a device according to the invention for supplying electricity to electrical equipment on the helicopter rotor by means of a generator provided with an air braking device attached to the rotor hub, FIG. 2 discloses the device in FIG. 1 in a view from above, FIGS. 3 and 4 disclose a simpler variant of the braking device.
Figure 2:
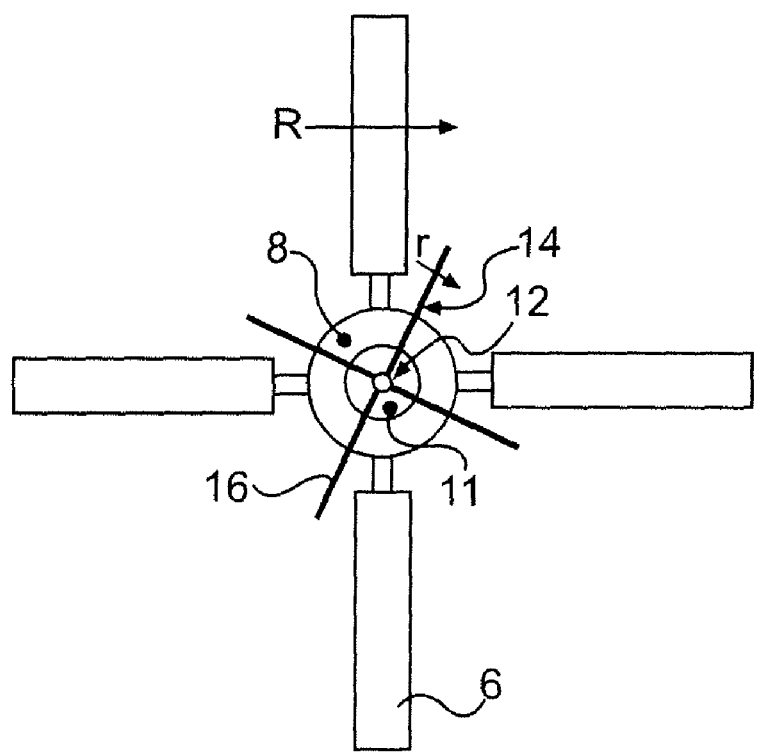

One embodiment of the invention will be described in the following only as an example with reference to the accompanying drawings. FIGS. 1 through 7 depict one operating environment for the instant invention. It should be stressed that the arrangement shown in the figures is merely illustrative and that any other configuration might be possible. As shown in FIGS. 1 and 2 an aircraft embodied by a helicopter 2 includes a rotatable first element like a rotor 3 configured by a shaft 4 with a plurality of rotor blades 6 affixed thereto at one end and coupled to a not shown engine at the other end. Further, said shaft 4 is configured with a rotor hub 8 coaxially arranged with said rotor shaft 4 and used for attachment of a device 10 for supplying electricity to electrical equipment on said rotor 3. Such electrical equipment might be of various kinds, e.g. a rotor interference warning system, components of which advantageously can be installed in said hub 8. Said device 10 comprises an electricity producing means, e.g. an electric generator 11. Normally, said generator is designed with a stator and a rotor provided with a drive shaft 12 and said rotor and drive shaft might be journalled in bearings in said stator.

The generator 11 including its stator is coaxially fixed to the rotor hub 8 and therefore rotates with the rotation speed of the rotor 3. A second element like an air braking device 14 is associated with said drive shaft 12 and is configured with at least one braking member 16 to be influenced by the surrounding fluid medium. In this embodiment said braking members are constituted by a plurality of blades 16 influenced by the surrounding air in rotating operation of the rotor 3 and thereby inducing a braking torque in said braking device 14. It is also possible to arrange the generator 11 the other way around with its drive shaft 12 coaxially fixed to the rotor hub 8 and the braking device 14 associated with the generator 11. The induced braking torque results in a difference in rotation speed for the braking device in relation to the rotatable element.

The generator 11 might be designed as a brushless alternating current generator, its rotor having permanent magnets and its stator armature windings. Hence slip-rings are avoided. The generator might have twenty poles and its windings might be shaped such that a three-phase system is achieved. This means that one mechanical revolution for the generator 11 corresponds to a frequency of ten electrical cycles, which after full-wave rectification of three-phased alternating current into direct current results in a sixty cyclic pulsating current, a so called the "ripple" of a current.

Where appropriate a not shown gear mechanism might be associated between the generator 11 and the braking device 14. Even if this will enable an increased rotation speed for the rotor of the generator relative to its stator, no addition of power will occur but a loss due to the fact that the mechanical efficiency of said gear mechanism can be estimated to no more than 85% to 95%. However, it might be advantageous to increase the frequency of the alternating current at rectification, e.g. smaller components can be used for filtering the ripple of the direct current. As this would be a step-up gearing, the gear ratio should be limited to maximum of four times, to avoid a self-braking to occur in the gear mechanism.

The braking device 14 might be configured by just one braking member 16 shaped as an airfoil or a blade 16 protruding from the drive shaft of the generator 11. Alternatively, the braking device might be configured in the shape of a blade wheel 14 with two or more evenly distributed protruding blades 16. FIGS. 1 and 2 disclose a basic embodiment of said blade wheel 14 configured with four blades 16 mutually divided by an angle of 90° and each blade given the shape of a straight blade plate 16.

Apart from the number of blades 16, which make up the blade wheel 14, it is essential that a braking torque $T_{AB}$ is achievable, which is sufficient to result in such a difference in rotating speed $f_{diff}$, which would be required for an estimated need of power, e.g. in an interval of approximately 25 W to 200 W.

Figure 3:
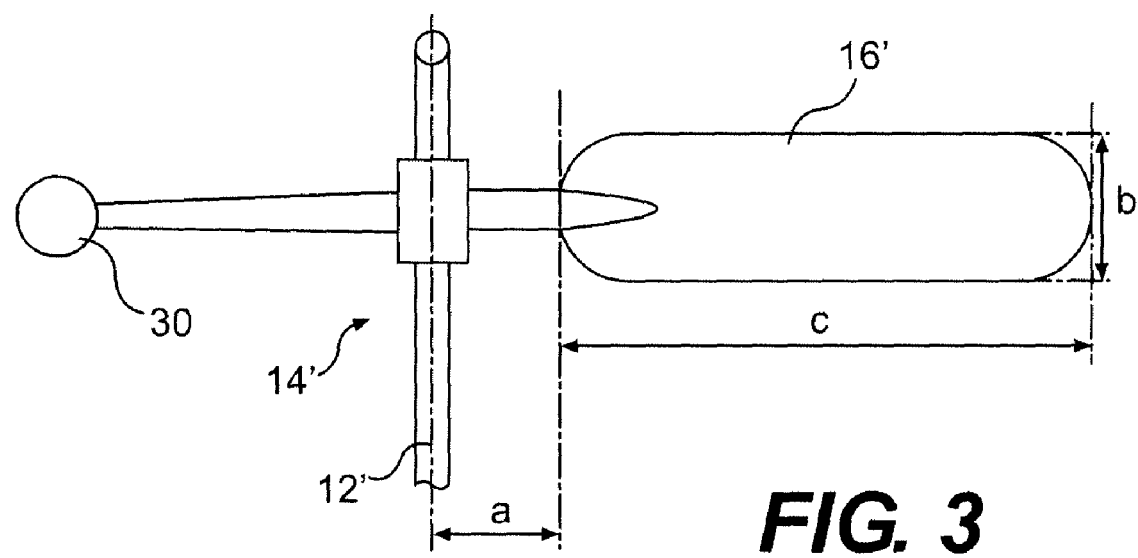
Figure 4:
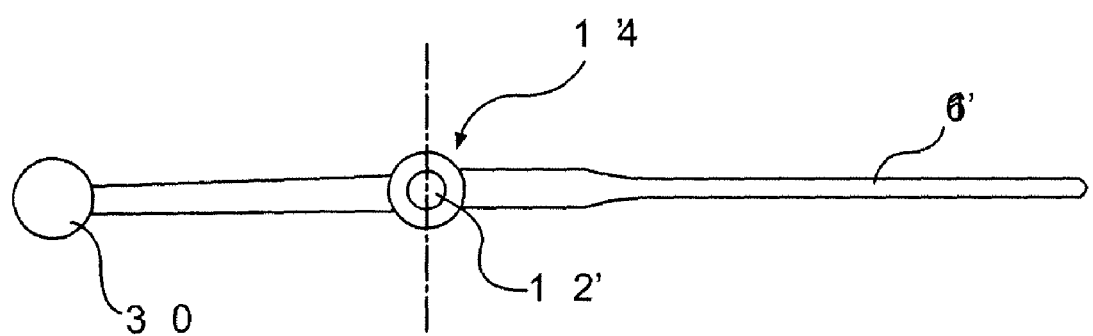

FIGS. 3 and 4 disclose a simple variant of braking device 14', which to this end might be configured by just one single airfoil having a straight blade plate, which for reasons to be described in more detail later (see tables 1 and 2) e.g. might be in the form of a paddle 16' with the following dimensions: (a) shaft length 0.15 m; (b) plate height 0.2 m; (c) plate length 0.8 m and attached to the drive shaft 12' with an angle of attack of 90° relative to the rotation direction. This means, on one hand when the helicopter is flying at a normal cruising speed of e.g. 250 km/h, with the aid of the forward speed wind, by vane action, said airfoil or paddle 16' might act just as a non-rotating vane and resulting in a maximum difference in rotating speed $f_{diff}$. On the other hand, when the helicopter is in a hovering situation, a balancing counterweight 30 would be needed as the single airfoil 16', in lack of the forward speed wind, might be brought to rotate at a relatively low rate in the same direction as the helicopter rotor 3.

Hence, even in a hovering situation, this braking device 14' would generate between 20 W and 320 W of power depending on chosen altitude and helicopter rotor rate (compare table 1 and 2).

Figure 5:
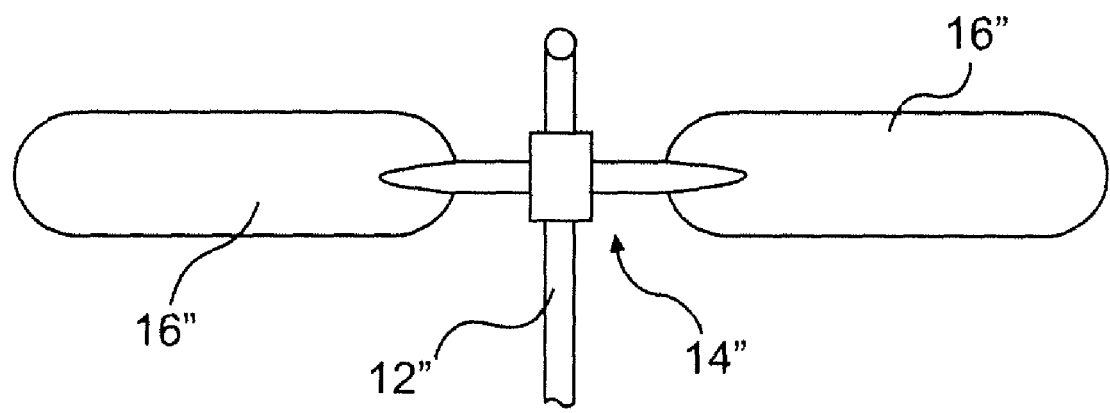
FIGS. 5 and 6 illustrate an advantageous embodiment of the braking device as provided with four evenly distributed paddles and FIG. 7 is a diagram, which discloses choice of values for maximum output power by means of a graph of the output power to the generator as a function of the airbrake rotation rate.
Figure 6:
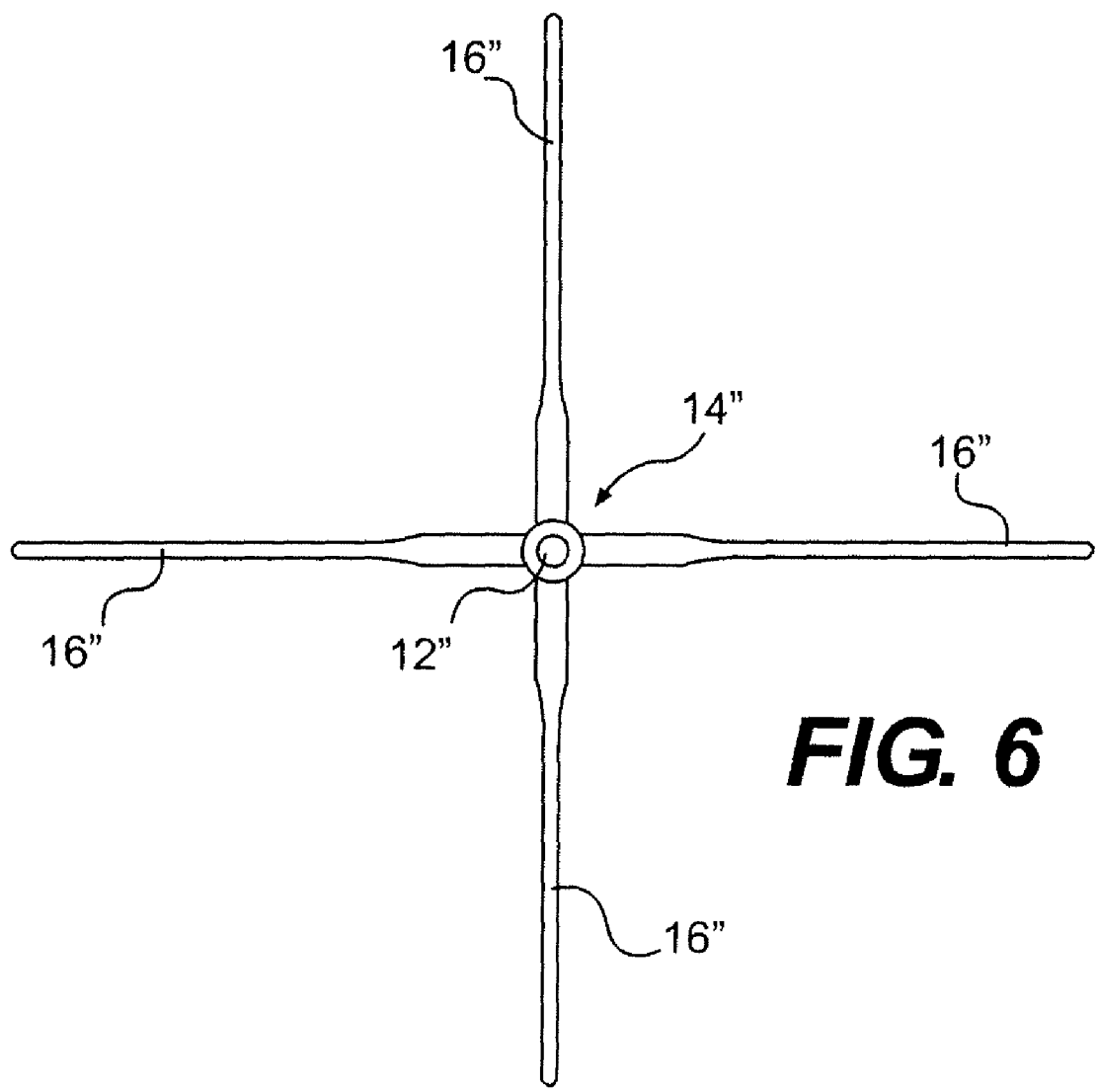

FIGS. 5 and 6 illustrate an advantageous example of said braking device configured by a blade wheel 14" mounted to the drive shaft 12" of the generator 11. One advantage with several blades is a large braking area with a limited overall diameter of the braking device. As appear from the basic data for the design of the airbrake, the calculations are based on a braking device provided with four evenly distributed blades, each of which is given the shape of a blade on a shaft, particularly a straight blade plate paddle 16". Due to counter-balancing forces, practically no influence of the forward speed wind would occur on said blade wheel 14", as in rotation each pair of mutually opposite paddles 16" exposes much of a same front area to said speed wind. Said balancing forces occur in that one paddle 16" in each of said pairs is moving towards and the other is following the speed wind. Consequently, by means of the balancing forces the influence of the speed wind is more or less negligible. By means of the blade wheel 14" provided with straight blade plate paddles 16" it is prevented that the braking device would rotate as a wind mill e.g. at helicopter cruising speeds and cause over-speed in the generator 11.

On the contrary, said overspeed might occur if each paddle on the blade wheel is given the shape of e.g. a not shown curved blade plate, which in this case actually would act as a wind mill. Therefore, blade wheels with curved blade plate paddles are rather applicable in exceptional cases for achieving a high output power during long time missions at helicopter cruising speeds.

Figure 7:
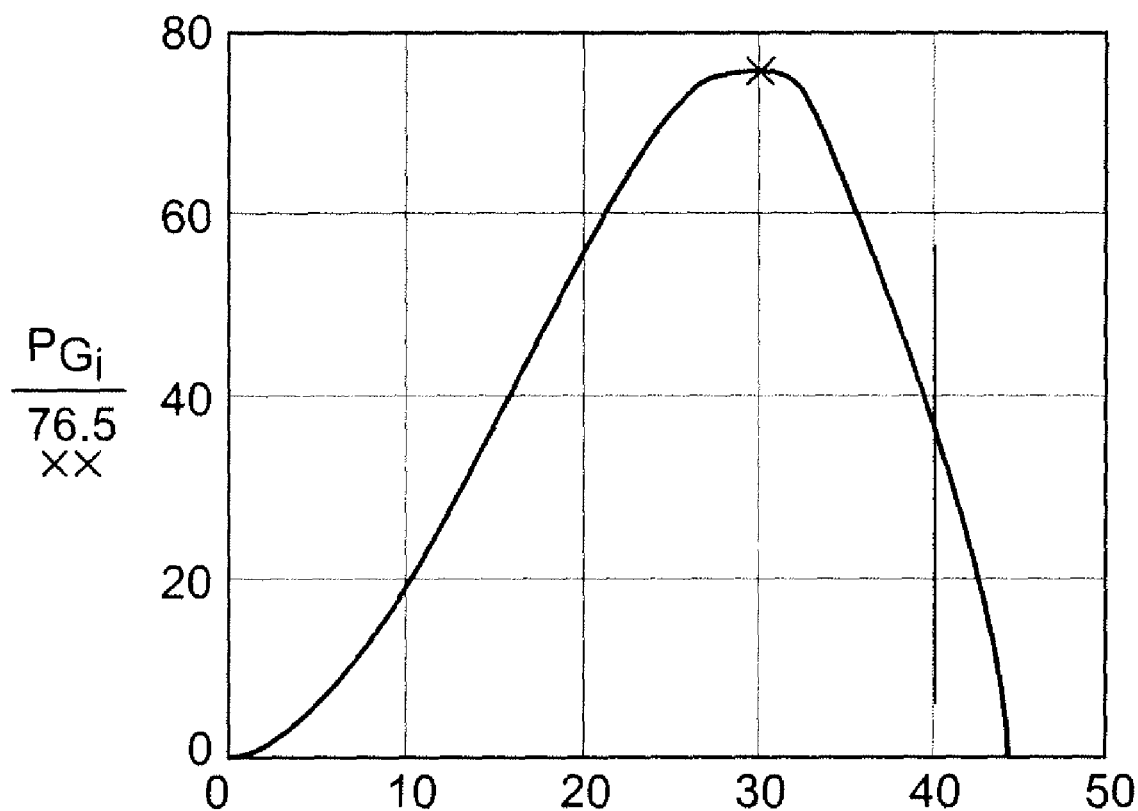

FIG. 7 is a diagram, which discloses a choice of values for output power by means of a graph of the output power to the generator as a function of the airbrake rotation rate. Appropriate formulas are disclosed on page 13, second paragraph.

The embodiments of the invention described above and shown with reference to the accompanying drawings are related to an aircraft exemplified by a helicopter only as an example. It should be stressed that the embodiments shown in the drawings depict one operating environment for the instant invention, which is merely illustrative, and that any other configurations might be possible.

For instance, the electricity producing means according to the invention might be applied to a different operating environment as propeller used in water associated with the propulsion machinery of a ship.

Basic Data for the Design of the Air Brake

Depending on the size and type of helicopter used, the rotation speed of its rotor normally varies between approx. 3 Hz and 7 Hz. There are helicopters with rotation speeds even outside this interval. For example a big helicopter as an AgustaWestland EH-101 has a rotor speed of 3.5 Hz and a small helicopter as a Eurocopter BO105 a rotor speed of 7.0 Hz. The rotation speed for a particular helicopter type is held within narrow limits.

A force required to overcome air drag can be calculated from the following formula (reference http://en.wikipedia.org/wiki/drag (physics)):

$$F=\tfrac{1}{2}\rho v^2 A C_d \qquad (1),$$

where
  $\rho$ is the density of the fluid (air)
  $v$ is the speed of the blade relative the air
  A is the area of the blade
  $C_d$ is the drag coefficient The air density varies with air pressure and altitude level. The following data are collected from International Standard Atmosphere (ISA).

|  | Sea Level | Altitude 2000 m |
|---|---|---|
| Density [kg/m³] | 1.225 | 1.225 × 0.8216 |

Each blade is configured as a flat plate, its length larger than its height. Its angle of attack might generally be set to 90°, even if other angles of attack between e.g. 45° and 90° would come at use. The following calculations are based on a braking device provided with four evenly distributed blades.

| Object | Drag coefficient $C_d$ | Reference |
|---|---|---|
| Squared flat plate at 90° | 1.17 | http://www.aerodyn.org/Drag/tables.html |
| Long flat plate at 90° | 1.98 | http://www.aerodyn.org/Drag/tables.html |
| Flat plate at 90° | 1.28 | http://www.grc.nasa.gov/WWW/K-12/airplane/shaped.html |

The calculations are based on a plausible coefficient $C_d$=1.3, emanating from different sources. It appears that length larger than height results in a larger value on coefficient $C_d$.

Calculations

The power to the generator depends on the fact that it is driven by the actual moment of force, which results from the braking action of the air braking device relative to the helicopter rotor. Also, the rotation speed of the air braking device will be further decreased in that the generator is seated as a "power steeling" rotating coupling between the helicopter rotor and the air braking device. The difference between the rotation speeds of the helicopter rotor and the air braking device constitutes the rotation speed of the generator. Ratings have been calculated for helicopter rotor speeds of 3.0 Hz, 3.5 Hz and 7.0 Hz. The area of the four blades has been adapted to give, on one hand approximately 60 W to 70 W mechanical power to the generator 11 and on the other 25 W to 200 W for a helicopter type having a rotor rotation rate of 7.0 Hz. Then, the electric output of the generator can be calculated by means of its efficiency coefficient. An illustrative example of calculation is elucidated on page 10.

Result

The results of the calculations are added up and shown in the tables 1 through 3.

In Table 1 the output power to the generator has been kept on the same level in order to achieve comparable figures. Please note that the larger blades are allocated the big helicopters. Hence, Table 1 discloses ratings for the same level of power outputs.

If different power outputs are desirable, this can be achieved by varying length and width of the blades. A range of power from 25 W to 200 W seems quite reasonable, see Table 2, which discloses ratings for different levels of outputs.

Electrical frequency after rectifying in relation to helicopter rotor rate is disclosed in Table 3 and is considered sufficiently high for a reasonable electrical direct current filtering. It is observed that the initially mentioned gear mechanism is not essential and might be excluded, as appear from the generator frequencies disclosed in Table 3.

Please note that the result depends on certain conditions, e.g. the value of $C_d$, which is a bit uncertain and therefore must be treated with caution. Further, the formula (1) is not valid for low rates of speed of the airbrake blades.

Choice of values for maximum output power are disclosed in FIG. 7, in which a graph illustrates the output power to the generator as a function of the airbrake rotation rate.

Illustrative Example of Calculations

Calculation of power that can be generated by a generator mounted on a rotating base and where the rotor of the generator is air braked.

Rotor frequency is 7 Hz and at sea level

Blade

Air Characteristic

International Standard Atmosphere

Air density at sea level $\rho := 1.225 \cdot \frac{kg}{m^3}$

Forces, Torques and Power

General formula: Force for airbrake is $F = \frac{1}{2}\rho v^2 A C_d$

The generator turns and is driven by the torque from the airbrake and the airbrake will rotate at a lower speed.

Rotation rate airbrake $\quad \omega_{1_i} := i \cdot \frac{\omega}{40} \qquad i := 0..40$ Torque air brake $\quad T_{AB_i} := \left[ \frac{1}{2} \cdot \rho \cdot h \cdot C_d \cdot n_B \cdot \sum_{m=0}^{n} [[\omega_{1_i} \cdot (a + m \cdot \Delta r)]^2 \cdot \Delta r] \right] \cdot \left( a + \frac{w-a}{2} \right)$ Power generator $\quad P_{G_i} := T_{AB_i} \cdot (\omega - \omega_{1_i})$

Tables of Result

TABLE 1 ratings for the same level of output

| | Rotor rate | | |
|---|---|---|---|
| | 3 Hz | 3.5 Hz | 7 Hz |
| Power at sea level [W] | 71 | 69.5 | 76.5 |
| Power at 2000 m [W] | 58.5 | 57.1 | 62.9 |
| Shaft length [m] | 0.3 | 0.3 | 0.15 |
| Plate height [m] | 0.2 | 0.2 | 0.1 |
| Plate length [m] | 0.55 | 0.45 | 0.4 |
| Plate area [m²] | 0.11 | 0.09 | 0.04 |
| Ratio plate length/height | 2.75 | 2.25 | 4.00 |

Height $\quad h := 0.1 \cdot rr$

Radius $\quad w := 0.55 \cdot rr \qquad \Delta r := 0.001 \cdot rr$

Distance from axis $\quad a := 0.15 \cdot rr$

Number of blades $\quad n_B := 4 \qquad n := \frac{w-a}{\Delta r}$

Drag coefficient, flat plate $\quad C_d := 1.3 \qquad n = 400$

Rotation rate $\quad f := 7 \cdot \frac{1}{s} \quad \omega := 2 \cdot \pi \cdot 1 \qquad \omega = 43.982 \frac{1}{s}$

TABLE 2 ratings for different levels of output

| | Rotor rate 7 Hz | | | |
|---|---|---|---|---|
| Power at sea level [W] | 25 | 76.5 | 200 | 200 |
| Shaft length [m] | 0.15 | 0.15 | 0.15 | 0.15 |
| Plate height [m] | 0.1 | 0.1 | 0.1 | 0.15 |
| Plate length [m] | 0.26 | 0.4 | 0.56 | 0.51 |
| Plate area [m$^2$] | 0.026 | 0.040 | 0.056 | 0.076 |
| Ratio plate length/height | 2.6 | 4.0 | 5.6 | 3.4 |

TABLE 3 electrical frequency after rectifying

| | Helicopter rotor rate | | |
|---|---|---|---|
| Generator | 3 Hz | 3.5 Hz | 7 Hz |
| Mechanical frequency [Hz] | 0.98 | 1.15 | 2.27 |
| Electrical frequency after rectifying [Hz] | 53 | 69 | 136 |

The choice of values for maximum output power are disclosed in FIG. 7, in which a graph illustrates the output power to the generator as a function of the airbrake rotation rate. Hence, the following formulas are applicable:

$$\text{Airbrake rotation} \quad \omega_{IG} := 29.7 \cdot \frac{1}{s}$$

$$\text{Power generator} \quad P_{0G} := 76.5 \cdot W$$

$$\text{Generator frequency} \quad f_G := \frac{\omega - \omega_{1G}}{2 \cdot \pi} \quad f_G = 2.273 \frac{1}{s}$$

The invention claimed is:

1. A device for supplying electricity to electrical components on a first element drivable for rotating operation with a predetermined rotation rate, said device comprising:
a source of electricity comprising a stator and a rotor that are rotatable in relation to each other in a rotation direction, one of the rotor and stator being attached to said first element and another of the rotor and stator being attached to a second element comprising at least one braking member, having a predetermined drag coefficient for interaction with a surrounding fluid medium in rotating operation and thereby inducing a braking torque, which results in a difference in rotation rate in the rotation direction between the first element and said second element and wherein an output to said source of electricity is based on a product of said braking torque and said rotation rate difference.

2. The device according to claim 1, wherein said second element comprises an air braking device and said at least one braking member comprises a blade or an airfoil for interaction with a said surrounding fluid medium as air.

3. The device according to claim 2, wherein said air braking device comprises a blade wheel provided with a plurality of blades.

4. The device according to claim 3, wherein each blade has a shape of a straight blade plate.

5. The device according to claim 3, wherein each blade has a shape of a curved blade plate.

6. The device according to claim 3, wherein said blades are evenly distributed on the blade wheel.

7. The device according to claim 3, wherein each blade in said plurality of blades has a shape of a blade on a shaft, which is attached to the blade wheel.

8. The device according to claim 2, wherein each airfoil in accordance with said predetermined drag coefficient has a blade plate area of 0.04 m$^2$ to 0.11 m$^2$ and an angle of attack of 45° to 90°.

9. The device according to claim 8, wherein said angle of attack is fixed to 90°.

10. The device according to claim 2, wherein each airfoil in accordance with said predetermined drag coefficient has a blade plate area of 0.025 m$^2$ to 0.076 m$^2$ and an angle of attack of 45° to 90°.

11. The device according to claim 1, wherein the first element comprises a rotor for an aircraft.

12. The device according to claim 11, wherein said rotor comprises rotor blades having an adjustable grade of pitch.

13. The device according to claim 1, wherein said second element comprises a water braking device and said at least one braking member comprises a blade for interaction with a said surrounding fluid medium as water.

14. A device for supplying electricity to electrical components on a first element drivable for rotating operation with a predetermined rotation rate wherein in operation said first element rotates, said device comprising:
a source of electricity comprising a stator and a rotor that are rotatable in relation to each other and around a same rotation axis in a same rotation direction as said first element, one of the rotor and stator being attached to said first element and another of said rotor and stator being attached to a second element comprising least one braking member having a predetermined drag coefficient for interaction with a surrounding fluid medium in rotating operation and thereby inducing a braking torque, which results in a difference in rotation rate in the rotation direction between the first element and said second element and wherein an output to said source of electricity is based on a product of said braking torque and said rotation rate difference.

* * * * *